(12) United States Patent
Ishikawa et al.

(10) Patent No.: US 11,084,097 B2
(45) Date of Patent: Aug. 10, 2021

(54) ADDITIVE MANUFACTURING WITH CELL PROCESSING RECIPES

(71) Applicant: Applied Materials, Inc., Santa Clara, CA (US)

(72) Inventors: David Masayuki Ishikawa, Mountain View, CA (US); Paul J. Steffas, Santa Clara, CA (US); Ajey M. Joshi, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 262 days.

(21) Appl. No.: 15/992,094

(22) Filed: May 29, 2018

(65) Prior Publication Data

US 2018/0369915 A1   Dec. 27, 2018

Related U.S. Application Data

(60) Provisional application No. 62/524,337, filed on Jun. 23, 2017.

(51) Int. Cl.
*B22F 10/20* (2021.01)
*B33Y 10/00* (2015.01)
(Continued)

(52) U.S. Cl.
CPC ............ *B22F 10/20* (2021.01); *B23K 26/082* (2015.10); *B29C 64/165* (2017.08);
(Continued)

(58) Field of Classification Search
CPC ............ B22F 3/1055; B22F 2003/1056; B22F 3/003; B22F 2003/1057; B33Y 30/00;
(Continued)

(56) References Cited

U.S. PATENT DOCUMENTS

| 4,643,569 A | 2/1987 | Sullivan et al. |
| 6,359,255 B1 | 3/2002 | Yamamoto et al. |

(Continued)

FOREIGN PATENT DOCUMENTS

| EP | 2926925 | 10/2015 |
| JP | 2009-006509 | 1/2009 |

(Continued)

OTHER PUBLICATIONS

International Search Report and Written Opinion in International Application No. PCT/US2018/038588, dated Nov. 8, 2018, 13 pages.

*Primary Examiner* — Thomas C Lee
*Assistant Examiner* — Michael Tang
(74) *Attorney, Agent, or Firm* — Fish & Richardson P.C.

(57) ABSTRACT

A method of additive manufacturing includes storing a plurality of predetermined cell processing recipes, dispensing a layer of a plurality of successive layers of feed material on a platform, receiving data describing an area of the layer of the feed material to fuse, determining a combination of a plurality of non-overlapping cells that substantially cover the area, and sequentially processing the plurality of cells. Each cell processing recipe includes scan path data indicating a path for an energy beam to follow, and different cell processing recipes having different paths for the energy beam. Each cell of the plurality of cells gets an associated cell processing recipe selected from the plurality of predetermined cell processing recipes. Each cell is processed by causing an energy beam to follow the first path for the cell processing recipe associated with the cell.

20 Claims, 12 Drawing Sheets

(51) Int. Cl.
  B33Y 50/02 (2015.01)
  B23K 26/082 (2014.01)
  B29C 64/393 (2017.01)
  B33Y 30/00 (2015.01)
  B29C 64/165 (2017.01)
  B29C 64/205 (2017.01)
  *B22F 3/00* (2021.01)
  *B22F 10/30* (2021.01)
  *B29C 64/135* (2017.01)

(52) U.S. Cl.
  CPC .......... *B29C 64/205* (2017.08); *B29C 64/393* (2017.08); *B33Y 10/00* (2014.12); *B33Y 30/00* (2014.12); *B33Y 50/02* (2014.12); *B22F 3/003* (2013.01); *B22F 10/30* (2021.01); *B29C 64/135* (2017.08)

(58) Field of Classification Search
  CPC ....... B33Y 50/02; B33Y 10/00; B29C 64/393; B29C 64/205; B29C 64/165; B29C 64/295; B29C 64/245; B29C 64/135; B23K 26/082
  See application file for complete search history.

(56) References Cited

U.S. PATENT DOCUMENTS

| | | | |
|---|---|---|---|
| 7,635,825 B2 | 12/2009 | Larsson | |
| 8,034,279 B2 | 10/2011 | Dimter et al. | |
| 8,784,720 B2 | 7/2014 | Oberhofer et al. | |
| 8,967,990 B2 | 3/2015 | Weidinger et al. | |
| 9,073,260 B2 | 7/2015 | El-Siblani et al. | |
| 9,073,261 B2 | 7/2015 | El-Siblani et al. | |
| 9,073,262 B2 | 7/2015 | El-Siblani et al. | |
| 9,079,355 B2 | 7/2015 | El-Siblani et al. | |
| 2003/0052105 A1 | 3/2003 | Nagano et al. | |
| 2006/0157454 A1* | 7/2006 | Larsson | B22F 3/1055 219/121.8 |
| 2006/0215246 A1 | 9/2006 | Kerekes et al. | |
| 2006/0228248 A1 | 10/2006 | Larsson | |
| 2010/0007062 A1* | 1/2010 | Larsson | B22F 10/20 264/485 |
| 2011/0299091 A1 | 12/2011 | Yun et al. | |
| 2013/0001834 A1 | 1/2013 | El-Siblani et al. | |
| 2014/0263209 A1 | 9/2014 | Burris et al. | |
| 2014/0271328 A1* | 9/2014 | Burris | B33Y 10/00 419/53 |
| 2015/0102531 A1 | 4/2015 | El-Siblani et al. | |
| 2015/0283761 A1 | 10/2015 | Maeda et al. | |
| 2016/0052014 A1 | 2/2016 | Halder et al. | |
| 2016/0098495 A1 | 4/2016 | Dong et al. | |
| 2017/0021454 A1 | 1/2017 | Dallarosa et al. | |
| 2017/0021455 A1* | 1/2017 | Dallarosa | B23K 26/0869 |
| 2017/0036404 A1 | 2/2017 | Rengers et al. | |
| 2017/0072463 A1 | 3/2017 | Ng et al. | |
| 2017/0165751 A1 | 6/2017 | Buller et al. | |
| 2017/0173736 A1* | 6/2017 | Gray | B29C 64/282 |
| 2017/0334144 A1* | 11/2017 | Fish | B29C 64/153 |
| 2018/0141160 A1* | 5/2018 | Karp | B23K 26/0608 |
| 2018/0180896 A1* | 6/2018 | Karlsen | G02B 6/262 |
| 2018/0257301 A1 | 9/2018 | Ng et al. | |

FOREIGN PATENT DOCUMENTS

| | | |
|---|---|---|
| KR | 10-1612254 | 4/2016 |
| WO | WO 2009/026520 | 2/2009 |
| WO | WO 2014/074947 | 5/2014 |
| WO | WO 2016/026706 | 2/2016 |
| WO | WO 2016/051163 | 4/2016 |

* cited by examiner

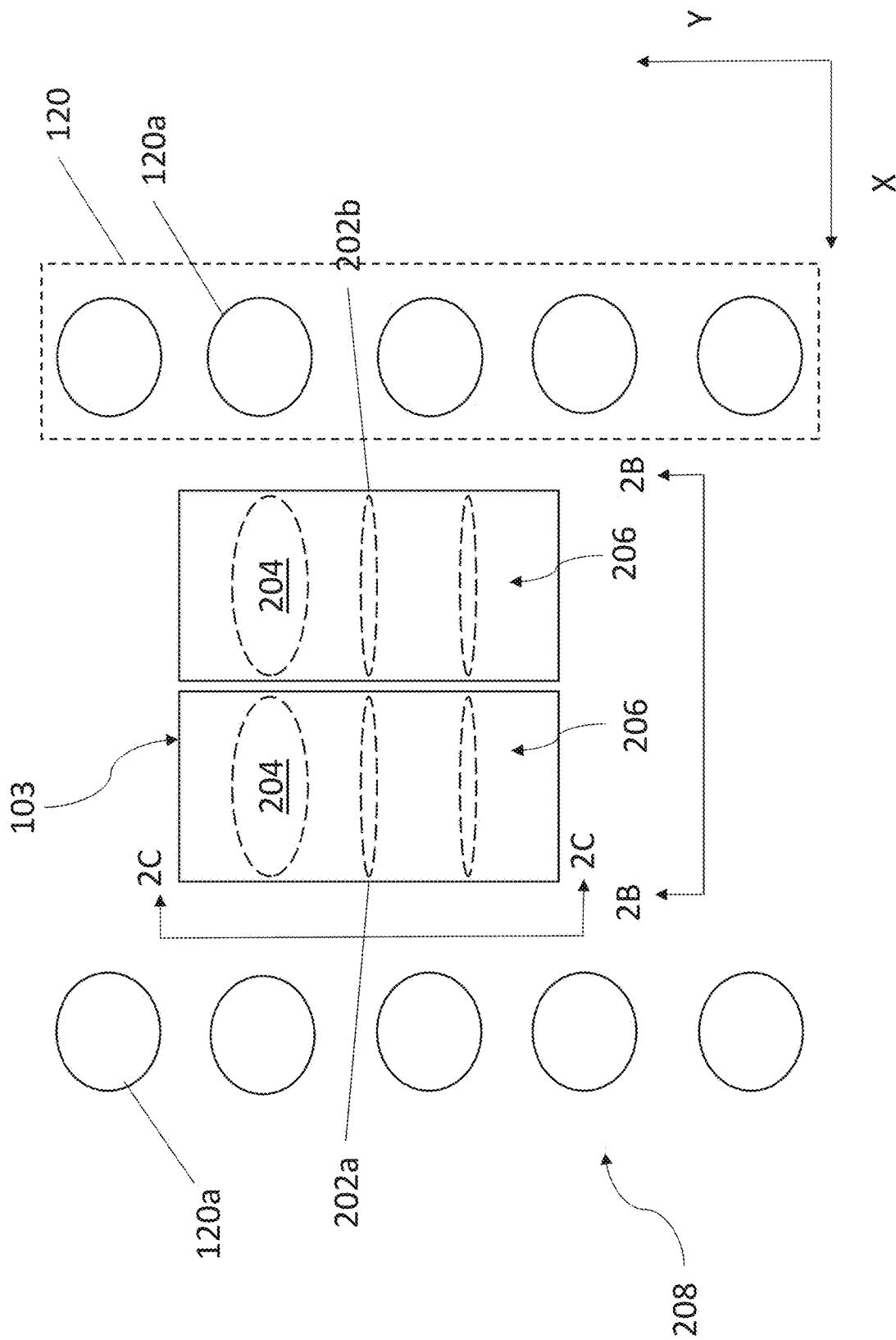

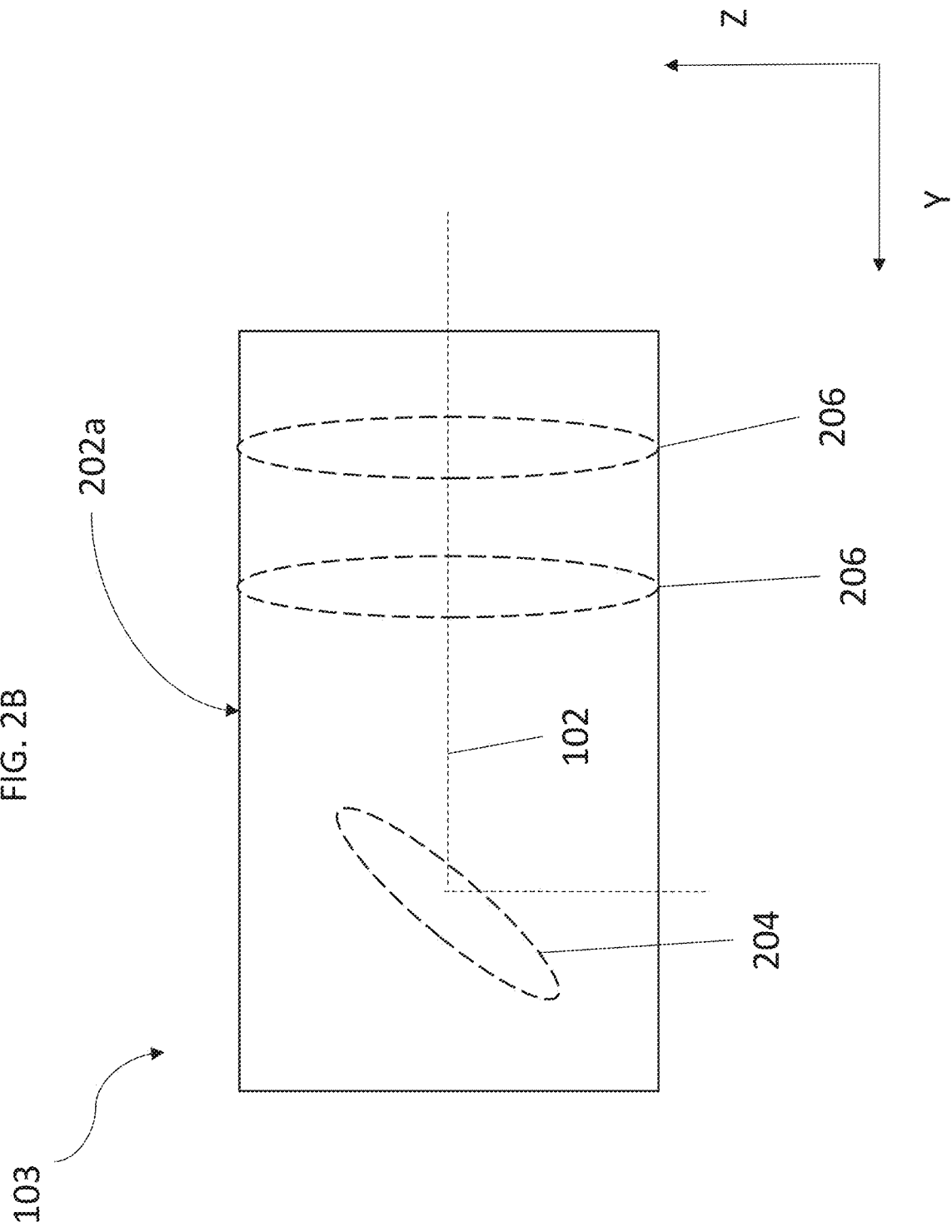

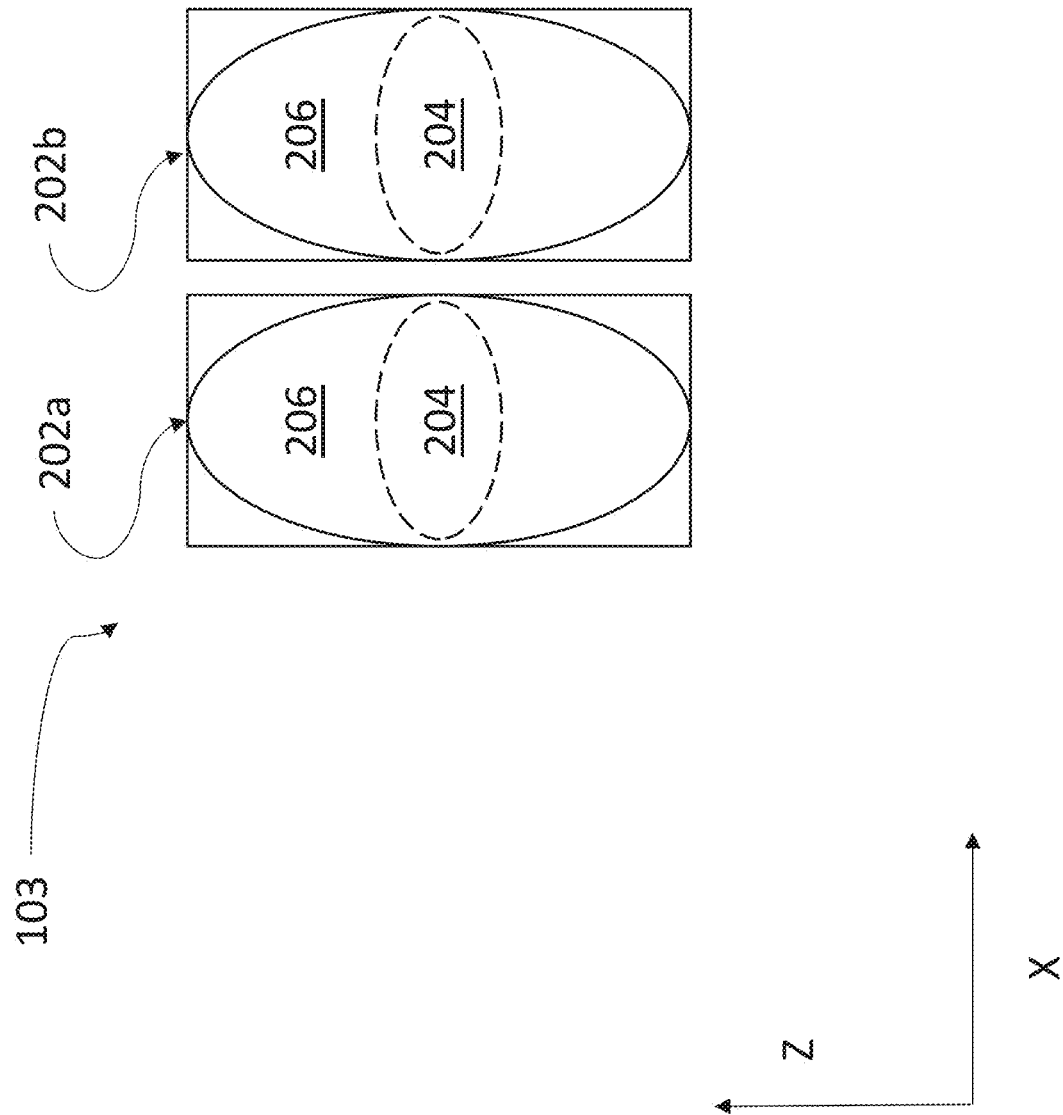

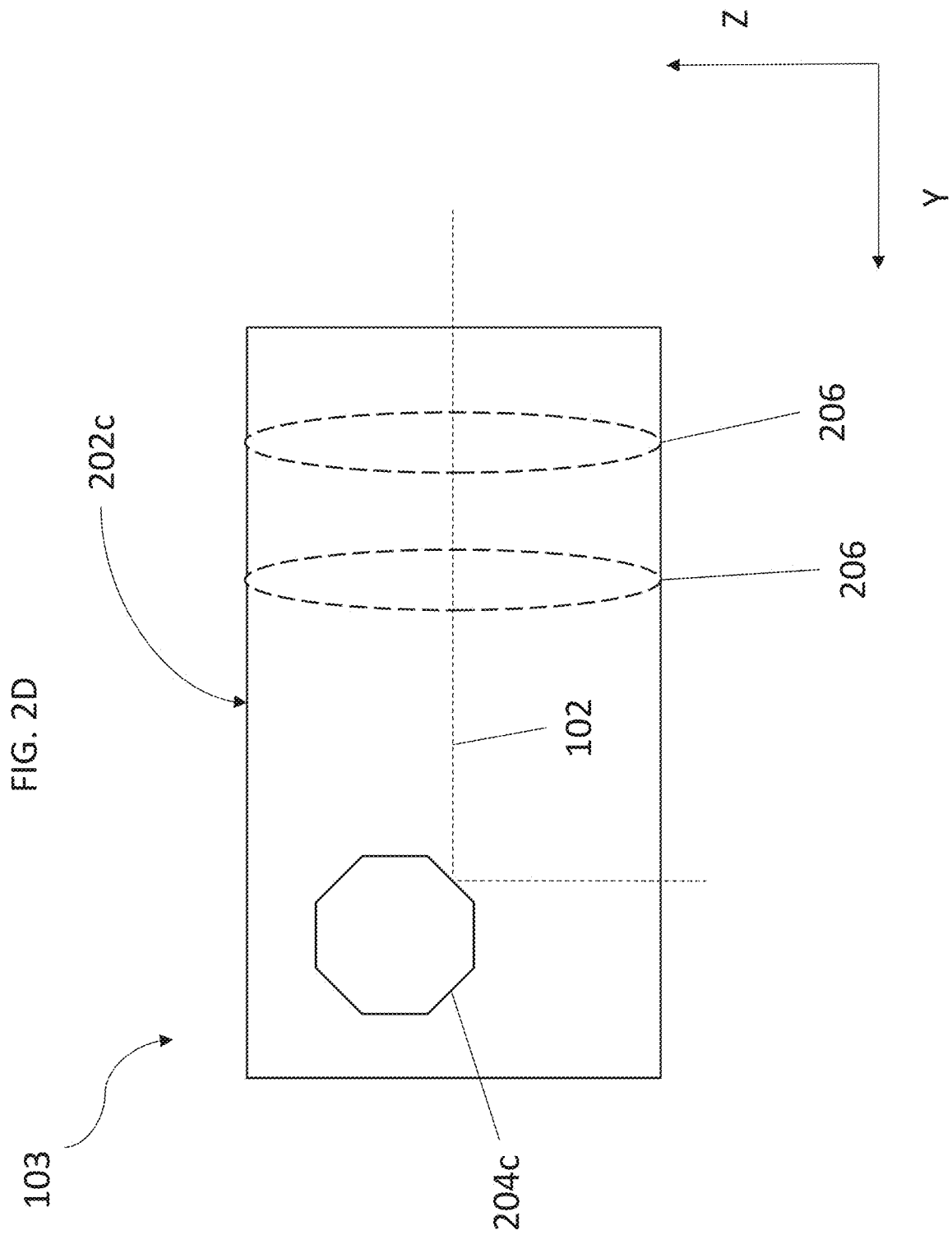

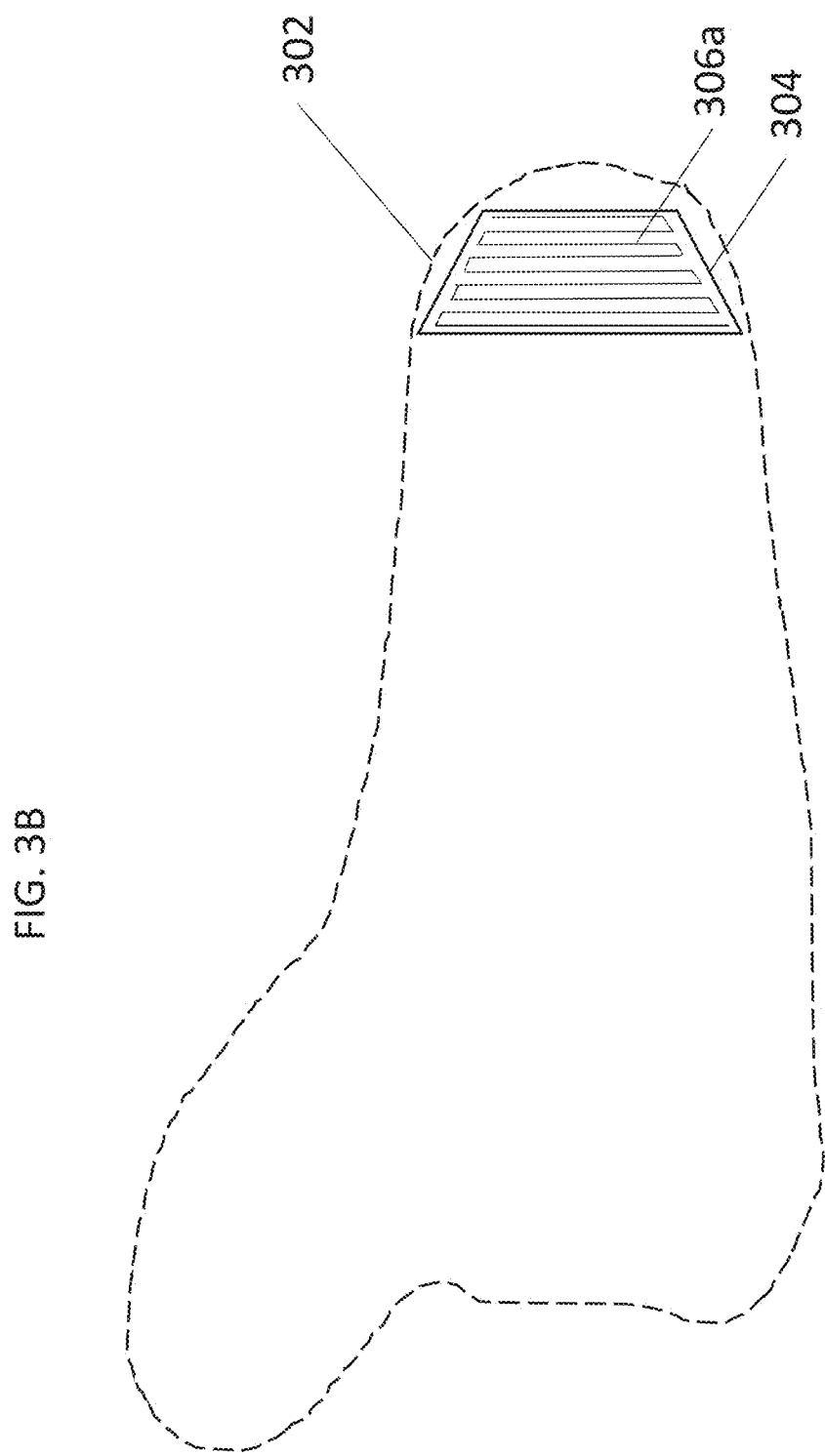

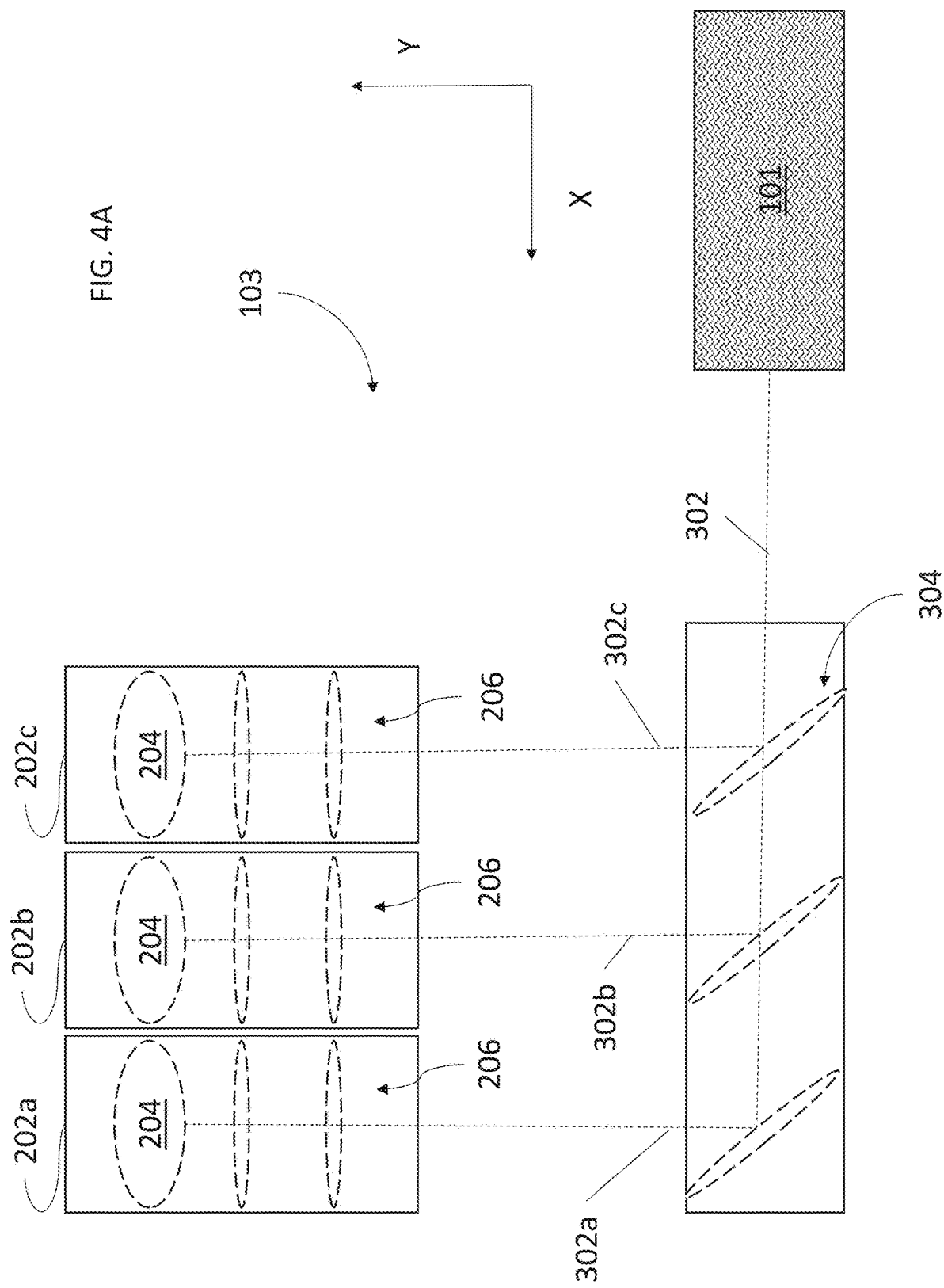

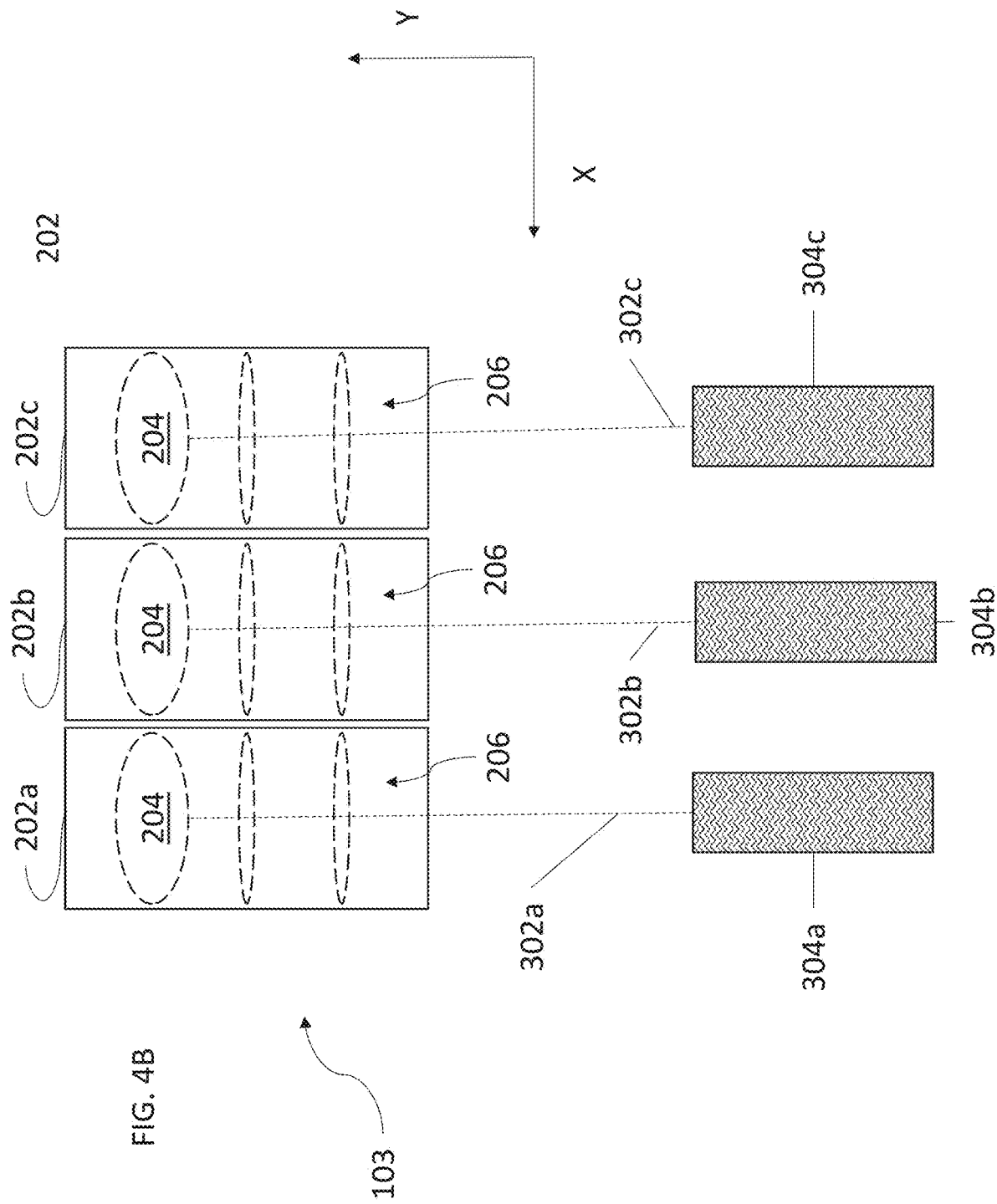

ADDITIVE MANUFACTURING WITH CELL PROCESSING RECIPES

CROSS-REFERENCE TO RELATED APPLICATIONS

This application claims priority to U.S. Provisional Application Ser. No. 62/524,337, filed Jun. 23, 2017, the entire disclosure of which is incorporated by reference.

TECHNICAL FIELD

This specification relates to additive manufacturing, also known as 3D printing.

BACKGROUND

Additive manufacturing (AM), also known as solid free-form fabrication or 3D printing, refers to a manufacturing process where three-dimensional objects are built up from successive dispensing of raw material (e.g., powders, liquids, suspensions, or molten solids) into two-dimensional layers. In contrast, traditional machining techniques involve subtractive processes in which objects are cut out from a stock material (e.g., a block of wood, plastic or metal).

A variety of additive processes can be used in additive manufacturing. Some methods melt or soften material to produce layers, e.g., selective laser melting (SLM) or direct metal laser sintering (DMLS), selective laser sintering (SLS), fused deposition modeling (FDM), while others cure liquid materials using different technologies, e.g., stereolithography (SLA). These processes can differ in the way layers are formed to create the finished objects and in the materials that are compatible for use in the processes.

In some forms of additive manufacturing, a powder is placed on a platform and a laser beam traces a pattern onto the powder to fuse the powder together to form a shape. Once the shape is formed, the platform is lowered and a new layer of powder is added. The process is repeated until a part is fully formed.

SUMMARY

This specification describes technologies relating to additive manufacturing.

In one aspect, an additive manufacturing apparatus includes a platform, a dispenser to deliver a plurality of successive layers of feed material on the platform, a light source to generate one or more light beams, a first galvo mirror scanner positioned to direct a first light beam onto a topmost layer of the plurality of successive layers, a second galvo mirror scanner positioned to direct a second light beam onto the topmost layer of the plurality of successive layers, and a controller configured to cause the first galvo mirror scanner to direct the first light beam to pre-heat or heat-treat an area of the topmost layer and to cause the second galvo mirror scanner to direct the second light beam to fuse the area of the topmost layer.

Implementations may include one or more of the following features.

The controller may be configured to control the first galvo mirror scanner to direct the first light beam to both pre-heat the area before the area has been fused by the second light beam and heat-treat the area after the area has been fused. The controller may be configured to control the second galvo mirror scanner to direct the first light beam to heat-treat the area of the powder bed after the area has been fused.

A plurality of heat lamps may be positioned above the powder bed. The controller may be configured to control the plurality of heat lamps to at least partially pre-heat the area of the powder bed. The controller may be configured to control the plurality of heat lamps to at least partially heat-treat the area of the powder bed after the area has been fused.

A polygon mirror scanner may be positioned to direct a third light beam onto a topmost layer of the plurality of successive layers on the platform. The controller may be configured to control the polygon laser scanner to cause the third light beam to at least partially heat-treat the area of the powder bed after the area has been fused. The controller may be configured to control the polygon laser scanner to cause the third light beam to at least partially pre-heat the area of the powder bed before the area has been fused. The light source may be a laser and the energy beam may be a laser beam. The controller may be configured to cause the first mirror galvo scanner to direct the first light beam to follow a first path on the topmost layer of feed material and to cause the second galvo mirror scanner to direct the second light beam to follow a second path on the topmost layer of feed material.

In another aspect, an additive manufacturing apparatus include a platform, a dispenser to deliver a plurality of successive layers of feed material on the platform, one or more energy sources to provide pre-heating, fusing, and heat-treating of a layer of feed material, the one or more energy sources configured to provide fusing of selectable voxels of the feed material, and a controller. The controller is configured to store a plurality of predetermined cell processing recipes, each cell processing recipe including scan path data indicating a path for an energy beam to follow to process one or more voxels of the feed material within a cell that encompasses a plurality of voxels, with different cell processing recipes having different paths for the energy beam, receive data describing an area of a layer of the feed material to fuse, determine a combination of a plurality of non-overlapping cells that substantially cover the area, each cell of the plurality of cells having an associated cell processing recipe selected from the plurality of predetermined cell processing recipes, and cause the one or more energy sources to sequentially process the plurality of cells, and for each cell causing the one or more energy sources to generate an energy beam and cause the energy beam to follow the first path for the cell processing recipe associated with the cell.

Implementations may include one or more of the following features.

Each cell processing recipe may include first scan path data indicating a first path for an energy beam to follow within the cell to pre-heat the one or more voxels of the feed material within the cell. The controller may be configured to control a galvo mirror scanner to direct the energy beam along the first scan path. The controller may be configured to control a polygon mirror scanner to direct the energy beam along the first scan path. Each cell processing recipe may include second scan path data indicating a second path for an energy beam to follow within the cell to fuse the one or more voxels of the feed material within the cell. The controller may be configured to control a galvo mirror scanner to direct the energy beam along the second scan path.

Each cell processing recipe may include third scan path data indicating a third path for an energy beam to follow within the cell to heat-treat the one or more voxels of the feed material within the cell. The controller may be configured to control a galvo mirror scanner to direct the energy beam along the third scan path. The controller may be configured to control a polygon mirror scanner to direct the energy beam along the third scan path.

Each cell processing recipe may include first scan path data indicating a first path for an energy beam to follow within the cell to pre-heat the one or more voxels of the feed material within the cell, and second scan path data indicating a second path for an energy beam to follow within the cell to fuse the one or more voxels of the feed material within the cell, and different cell processing recipes may have at least one of different first paths or different second paths for the energy beam.

Each cell processing recipe may include second scan path data indicating a second path for an energy beam to follow within the cell to fuse the one or more voxels of the feed material within the cell, and third path data indicating a third path for an energy beam to follow within the cell to heat-treat the one or more voxels of the feed material within the cell, and different cell processing recipes may have at least one of different second paths or different third paths for the energy beam.

Particular implementations of the subject matter described in this specification can be implemented so as to realize one or more of the following advantages. Pre-heating and post-heating can be controlled. The amount of power needed by the beam used for fusing can be reduced, and/or the beam can move more quickly across the layer and thus can increase throughput. In addition, the frequency and severity of temperature deviations away from a preferred processing temperature set point can be reduced. Reducing temperature deviations is advantageous for reducing thermal stress, improving melt pool keyhole depth and stability, and reducing microstructure variation due to thermal variation. These processing advantages directly improve part porosity, fatigue resistance, yield strength, and can simplify post processing.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2A is a schematic diagram of a top view of an energy delivery system that includes an example optical engine.

FIG. 2B is a schematic diagram of a side view of the optical engine of FIG. 2A along line 2B-2B.

FIG. 2C is a schematic diagram of a front view of the optical engine of FIG. 2A along line 2C-2C. FIG. 2D is a schematic diagram of a side view of another optical engine.

FIGS. 3A-3D are schematic diagrams of example polygons and scan paths.

FIG. 4A is a schematic diagram of a top view of an example optical apparatus.

FIG. 4B is a schematic diagram of a top view of an example optical apparatus.

Like reference numbers and designations in the various drawings indicate like elements.

DETAILED DESCRIPTION

Figure 1:
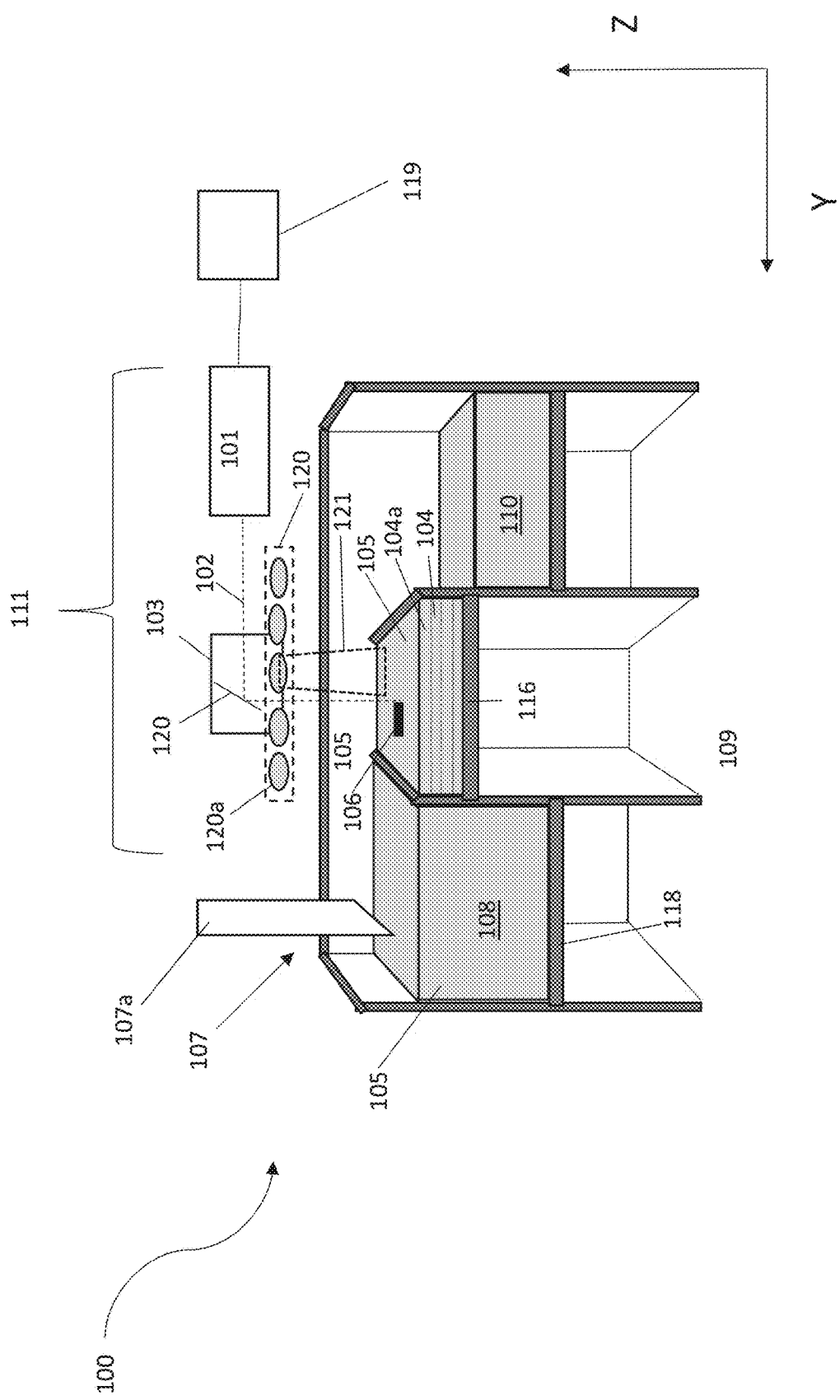
FIG. 1 is a schematic diagram of a perspective cross-sectional view of an example additive manufacturing system.

An additive manufacturing process can involve dispensing a layer of feed material, for example, a powder, on a platen or a previously deposited layer, followed by a method to fuse portions of the layer of feed material. An energy source heats up the feed material and causes it to solidify, e.g., to cause the powder to fuse. However, precise thermal control can be needed to meet part quality and yield requirements. Overheating can result in porosity due to unstable melt pool keyhole formation and collapse during the melting process. On the other hand, if too little heat is applied or too much heat is lost then fusing can be incomplete. In addition, warping, stress-induced cracking and deformation can occur if there is a steep spatial thermal gradient over the top layer.

In an additive manufacturing process, the feed material can be heated prior to being deposited over the platen. This can reduce the amount of power needed by the scanning beam to cause a particular voxel to solidify. This permits the beam to move more quickly across the layer, and thus can increase throughput. In addition, this can reduce the size of the temperature fluctuations, and thus reduce thermal stress and improve material properties.

Pre-heating a platform that supports the powder can control the temperature profile of the top layers for short parts, but fails to alleviate and can even exasperate temperature control for tall parts. Heat conducted from the platform to the part will not reach the top layers of tall parts because the distance from the pre-heated platform to the topmost layer of feed material is too great as the build progresses. Increasing the amount of heat from the platform to try heat the top layers of tall parts causes the bottom layers to be over-heated.

However, a feed powder and the topmost melted layers can be pre-heated by a fixed or scanned light beam prior to fusing in order to reduce the thermal gradient during the manufacturing process, which can improve sintering quality and throughput. The reduced thermal gradient can at least partially reduce thermal stresses during the manufacturing process. Heat can also be applied by a scanned or fixed light beam to the fused sections after fusing (also referred to as "heat-treating" or "post-heating") in order to control the rate of cool-down and thereby reduce residual stresses and further improve sintering quality, e.g., by reducing the likelihood of warping and cracking of the part. The heat can also be used to compensate for thermal non-uniformity due to radiative, convective, and conductive losses.

This disclosure describes a method and apparatus for additive manufacturing. The apparatus can include an optical engine with at least one galvo mirror scanner and an array of heat lamps. An optical assembly that includes such an optical engine is capable of directing one or more light beams to pre-heat, fuse, and/or heat-treat a feed material during the manufacturing process.

Particular implementations involve different energy point sources such as filaments or diodes and optical elements such as reflectors or lenses for directing and shaping the radiation-based heating profile on the platform. IR lamp arrays can simultaneously apply patterned or uniform radiation from one or more IR lamp filaments to the platform. Reflecting and focusing elements influence the heating profile on a platform under an IR lamp array. An IR lamp array can apply heat for a duration from seconds to hours and is scalable beyond one meter square platforms.

In some cases, it is necessary to heat a small region within the heat affected zone of an individual IR lamp, e.g., when building parts or portions of larger parts that are smaller than the typical spot size of an IR lamp. Polygon heating can be more effective than IR lamps because the diode spot incident on the feed material is substantially less diffuse and more focused at the millimeter scale or smaller. Galvo heating can be similar to polygon heating for facilitating higher watt density and smaller spot size than IR lamps. Furthermore, galvo heating has an added advantage of enabling heating of fine and complex patterns. For example, galvo heating is suitable for heating regions that will correspond to thin walls found in heat exchangers. The advantage of polygon heating over galvo heating is higher laser utilization due to reduced time turning off the point source while orienting steering mirrors. Thus, polygon heating is more effective at heating regular polygon shaped patterns. Polygon shaped patterns can be used to fill the hatch area of the part.

An example implementation of the subject matter IR lamp heating to elevate and maintain the part at elevated temperature to reduce residual stress, polygon heating concurrent with laser melting to maintain portions of the hatch region of the topmost layer at an elevated temperature to control the cooling local rate, and galvo heating concurrent with laser melting to maintain contours and thin wall sections at elevated temperature to control the local cooling rate. It is noteworthy that the example implementation addresses temperature control on the topmost layer and as the part becomes taller. The present techniques are compatible with conventional build plate heaters that direct heat from the bottom.

FIG. 1 shows an example additive manufacturing system 100. The additive manufacturing system 100 includes a build platform 116 to hold the object being fabricated, a feed material delivery system 107 to deliver successive layers 104 of feed material 105 over the platform 116, and an optical assembly 111 to generate multiple light beams that will be used for fusing, pre-heating and/or heat-treatment of each layer of feed material.

In some implementations, such as the implementation illustrated in FIG. 1, the feed material delivery system 107 can include a flat blade or paddle 107a to push a feed material 105 from a feed material reservoir 108 across the build platform 116. In such an implementation, the feed material reservoir 108 can also include a feed platform 118 positioned adjacent the build platform 116. The feed platform 118 can be elevated to raise some feed material above the level of the build platform 116, and the blade or paddle 107a can push the feed material 105 from the feed platform 118 onto the build platform 116.

Alternatively or in addition, the feed material delivery system 107 can include a dispenser that is suspended above the platform 116 and that has a plurality of apertures or nozzles through which the powder is metered and flows. For example, the powder could be throttled or otherwise metered through an element restrictive to flow under gravity, or be ejected, e.g., by piezoelectric actuator. Control of dispensing of individual apertures or nozzles could be provided by pneumatic valves, microelectromechanical systems (MEMS) valves, solenoid valves, and/or magnetic valves. Other systems that can be used to dispense powder include a roller having apertures, and an augur inside a tube having a plurality of apertures.

Optionally, the system 100 can include a compaction and/or levelling mechanism to compact and/or smooth the layer of feed materials deposited over the build platform 116. For example, the system can include a roller or blade that is movable parallel to the surface of the platform 116 by a drive system, e.g., a linear actuator.

The feed material 105 can include metallic particles. Examples of metallic particles include metals, alloys and intermetallic alloys. Examples of materials for the metallic particles include aluminum, titanium, stainless steel, nickel, cobalt, chromium, vanadium, and various alloys or intermetallic alloys of these metals.

The feed material 105 can include ceramic particles. Examples of ceramic materials include metal oxide, such as ceria, alumina, silica, aluminum nitride, silicon nitride, silicon carbide, or a combination of these materials, such as an aluminum alloy powder.

The feed material can be dry powders or powders in liquid suspension, or a slurry suspension of a material. For example, for a dispenser that uses a piezoelectric printhead, the feed material would typically be particles in a liquid suspension. For example, a dispenser could deliver the powder in a carrier fluid, e.g. a high vapor pressure carrier, e.g., Isopropyl Alcohol (IPA), ethanol, or N-Methyl-2-pyrrolidone (NMP), to form the layers of powder material. The carrier fluid can evaporate prior to the sintering step for the layer. Alternatively, a dry dispensing mechanism, e.g., an array of nozzles assisted by ultrasonic agitation and pressurized inert gas, can be employed to dispense the first particles.

The additive manufacturing system 100 includes a controller 119 that can store digital data representing a pre-defined pattern that can form the object 106. The controller 119 controls the optical assembly 111 to generate multiple light beams that will be used for fusing, pre-heating and/or heat-treatment of the layer of feed material.

The optical assembly 111 can include an array of heat lamps 120 that can include one or more heat lamps 120a. Each heat lamp 120a is capable of generating a light beam 121 to impinge the outer most layer 104a of the feed material 105. Each light beam can provide heat to the feed material 105 on a specified section of the platform 116. The heat can be used to at least partially pre-heat or heat treat a portion of the feed material 105.

The optical assembly 111 includes a light source 101 to generate a light beam 102 to impinge the outermost layer 104a of the feed material 105. The light beam 102 selectively delivers sufficient heat to fuse the feed material 105 according to the pre-defined pattern stored in the controller 119. Fusing in the context of this specification can include melting and solidification, or sintering while still in solid form, or other processes of fusing a powder. While the illustrated implementation utilizes a single light source emitting a single light beam, multiple light sources can be used to generate multiple light beams. Examples of such implementations are given in greater detail later within this disclosure.

In general, the light beam 102 generated by the light source 101 has a spot size corresponding to (or is controllable to selectively fuse) an individual voxel of feed material. In contrast, the light beam 121 generated by each lamp 120a has a larger spot on the feed material than the light beam 102. The light beam 121 can span multiple voxels, e.g., at least a 5×5 voxel area.

The light beam 102 is caused by an optical engine 103 to scan at least along a first axis (also referred to as a Y-axis). The optical engine 103 is controlled by the controller 119 and is described in greater detail later within this disclosure.

The Y-axis can be parallel to the direction of motion of the dispenser 107 (e.g., from left to right in FIG. 1), e.g., the blade or nozzles, across the platform. Alternatively, the Y-axis can be perpendicular to the direction of motion of the dispenser 107.

Movement of the light beam 102 along the X-axis can be facilitated by motion of the platform 116, motion of a support holding the optical engine 103, by tilting a portion of the optical engine 103 about the Y-axis, by using dual-axis galvo mirror, or by placing a separate galvo mirror scanner positioned before or after the optical engine 103 and within the path of the light beam 101 to deflect the light beam 101 along the X-axis.

Where the light source 101 generates multiple light beam, different light beams can use different mechanisms to provide movement along the X-axis. For example, the galvo mirror scanner 202 can have a second galvo mirror scanner 202b. In some implementations, motion of the different light beams along the X-axis can be independently controlled. In some implementations, e.g., where the scanners are attached to the same support that is laterally movable, the light beams have a fixed relative position relative to the support along the X-axis.

Movement of the light beam(s) 121 along the X-axis can be facilitated by motion of the platform 116, or motion of a support holding the lamp array 120. In some implementations, the lamp array 120 is fixed to the same movable support as the optical engine 103; in this case a single actuator can be used to move both synchronously along the X-axis. In some implementations, the lamp array 120 and the optical engine 103 have separate supports and are independently movable.

FIGS. 2A-2C show top, front, and side views, respectively, of an example optical engine 103. The optical engine 103 can include a mirror scanner 202a, such as a galvo mirror scanner. The galvo mirror scanner 202a that includes a movable mirror 204 and focusing lenses 206. The galvo mirror scanner 202a can direct a light beam, such as light beam 102, to impinge a layer of the feed material 105 on the platform 116. The focusing lenses 206 focus the light beam 102 in order to provide a desired spot size at the outermost layer 104a of the feed material. The galvo mirror scanner 202 can be used for pre-heating the feed powder 105, fusing the feed powder 105, or heat-treating the feed powder 105 after it is fused, or any combination. Heat-treating in the context of this disclosure includes controlling a rate of cooling of the feed material after it has been fused.

The optical engine 103 can also include a second mirror scanner 202b, such as a second galvo mirror scanner 202b. The second galvo mirror scanner 202b can direct a second light beam to impinge a layer of the feed material 105 on the platform 116. In construction, the second galvo mirror scanner 202b can otherwise be similar to the galvo mirror scanner 202a. The second mirror scanner 202b can be used for pre-heating the feed powder 105, fusing the feed powder 105, or heat-treating the feed powder 105 after it is fused, or any combination. Heat-treating in the context of this disclosure includes controlling a rate of cooling of the feed material after it has been fused.

Alternatively, referring to FIG. 2D, a rotating polygonal mirror scanner 202c can be used for either or both mirror scanners 202a and 202b. The rotating polygonal mirror scanner 202c that includes a rotatable polygon 204c with mirrored sides and focusing lenses 206. As the polygon rotates, the light beam 102 is swept across the layer of feed material.

In some implementation, the first mirror scanner 202a, e.g., a galvo mirror scanner, is used for pre-heating the feed powder 105, and the second mirror scanner 202b, e.g., a galvo mirror scanner, is used for fusing the feed material 105. In some implementation, the first mirror scanner 202a, e.g., a galvo mirror scanner, is used for fusing the feed material 105, and the second mirror scanner 202b, e.g., a galvo mirror scanner, is used for heat-treating the fused feed material 105. In some implementation, the first mirror scanner 202a, e.g., a galvo mirror scanner, is used for both pre-heating and heat-treating the feed powder 105, and the second mirror scanner 202b, e.g., a galvo mirror scanner, is used for fusing the feed material 105.

For each light beam, as the light beam sweeps along a path on the layer, the light beam can be modulated, e.g., by causing the respective light source to turn the light beam on and off, in order to deliver energy to selected regions of the layers of feed material 110. A set of example scan regions is shown in FIGS. 3A-3D.

Figure 3A:
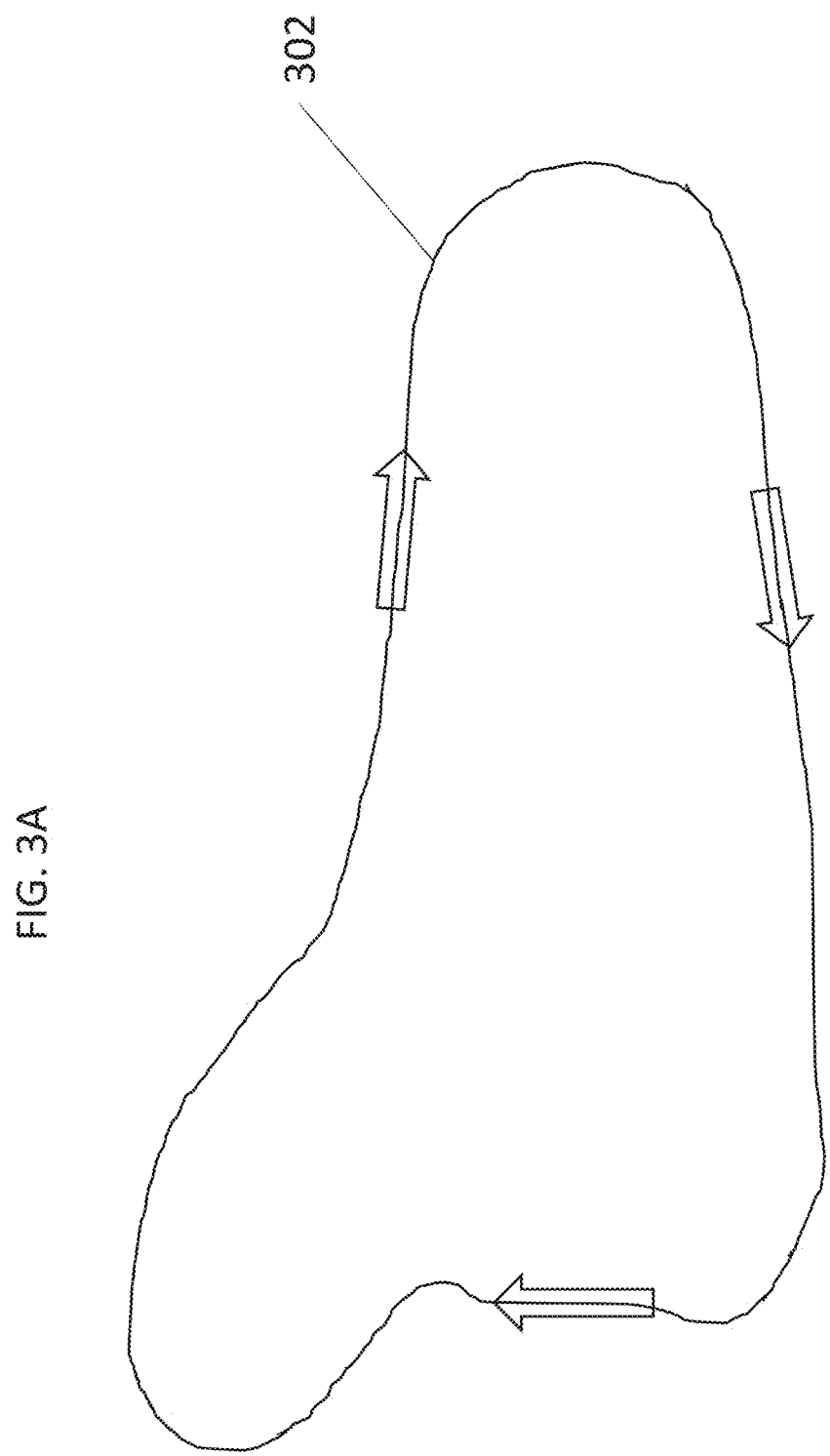

In FIG. 3A, a first light path can be traced with a galvo mirror scanner, such as the second galvo mirror scanner 202b. The light beam following this path can raise the temperature of a feed material above a fusion temperature. This technique can be used to fuse the contour of the object being fabricated; the interior of the object can be fused separately.

The controller 119 can store a multiple predetermined cell processing recipes. A cell is an area of the feed material that encompasses multiple voxels. Each cell processing recipe includes scan path data indicating a path for an energy beam to follow to process one or more voxels of the feed material within a cell. Different cell processing recipes having different paths for the energy beam.

The controller is configured to receive data, e.g., in a computer readable format, describing an area of a layer of the feed material to fuse in order to form the object. For example, the contour of the area to fuse can be the initial outline traced by the galvo mirror scanner in FIG. 3A.

Figure 3C:
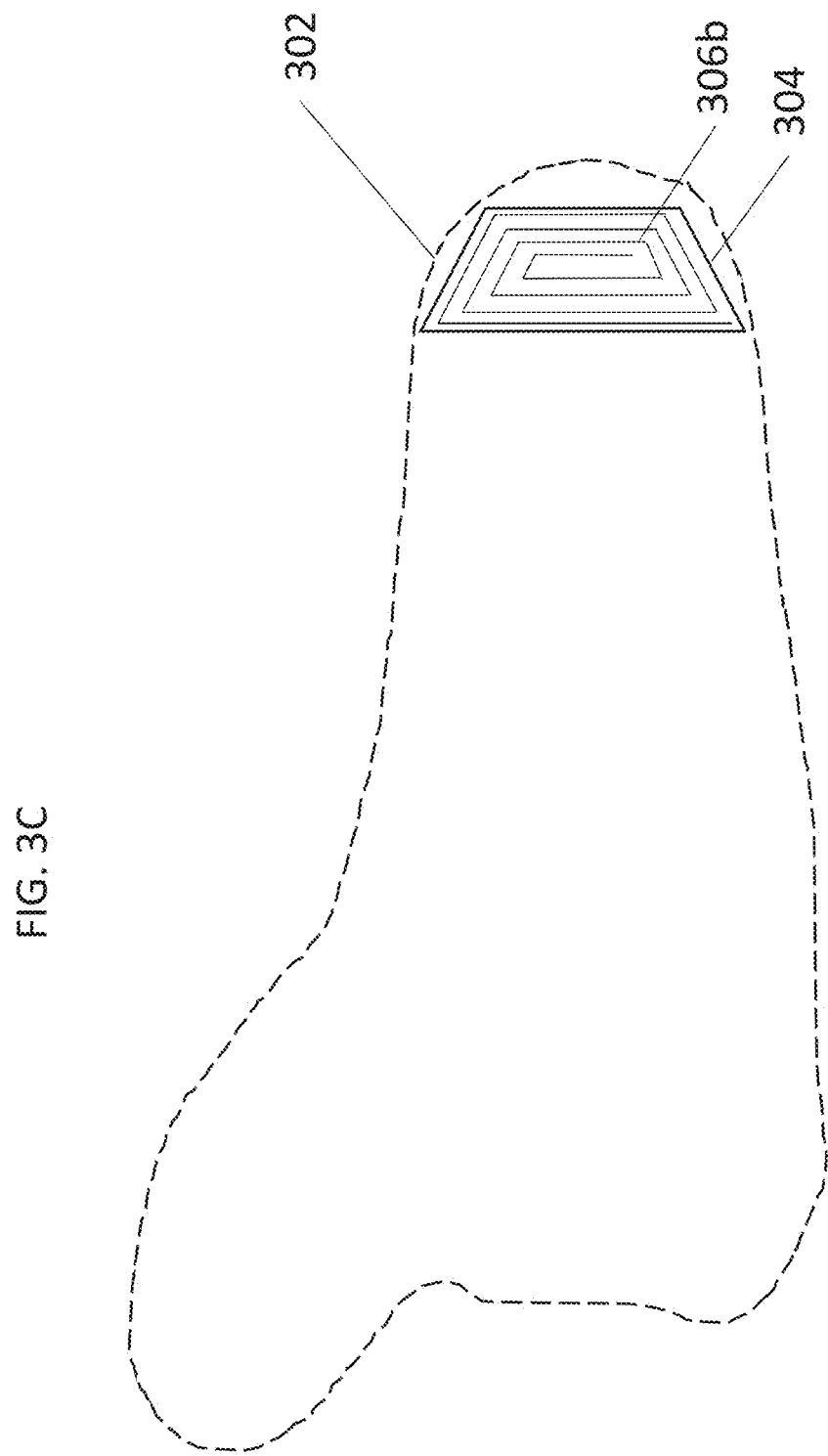
Figure 3D:
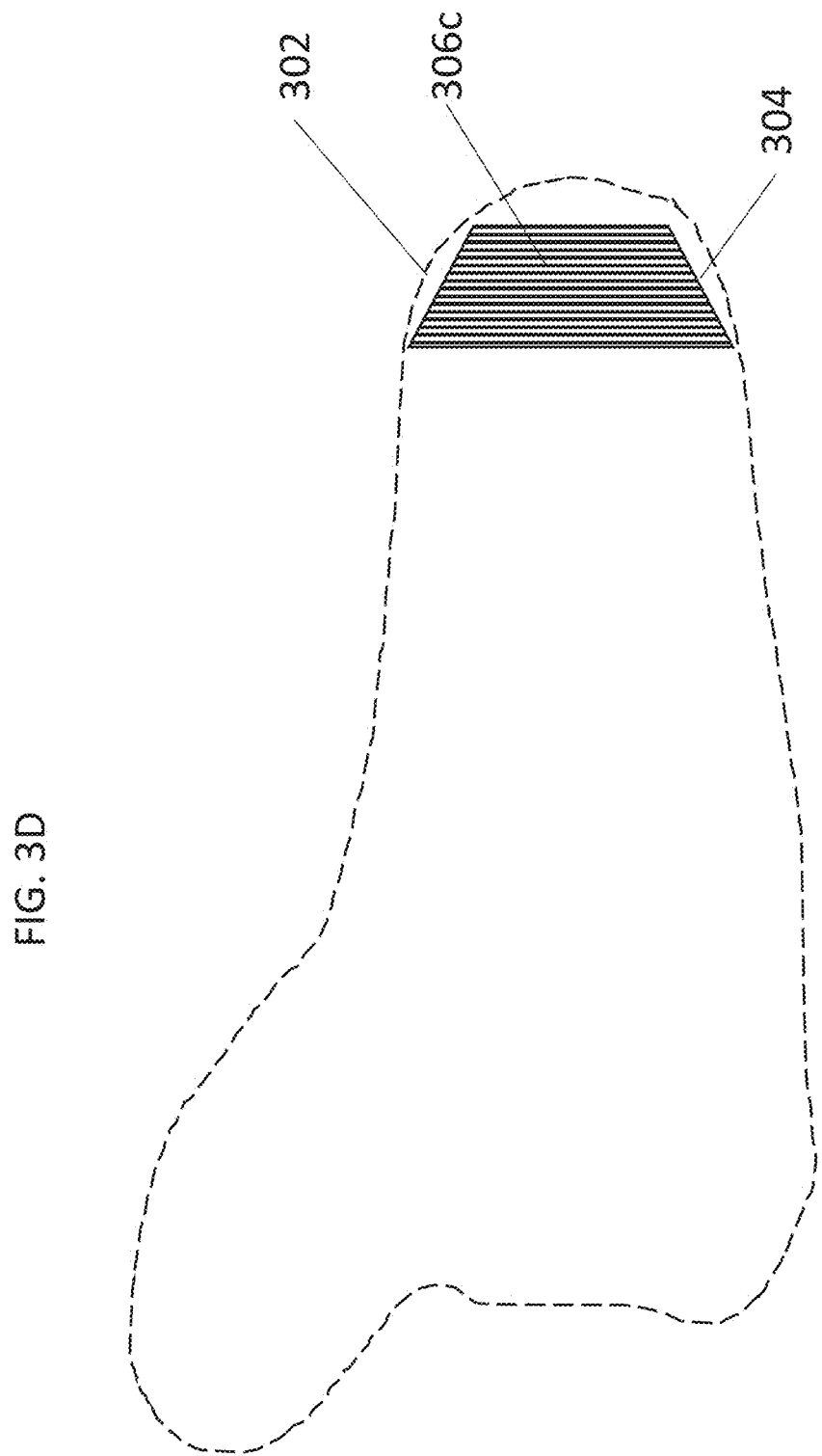

The controller is also configured to determine a combination of a plurality of non-overlapping cells that substantially cover the area. Each cell has an associated cell processing recipe. i.e., one of the stored plurality of predetermined cell processing recipes. In effect, the controller breaks the area to be fused into individual cells, each having an associated cell processing recipe. An example polygon cell 304 (in this case a trapezoid) is illustrated in FIGS. 3B-3D.

The controller 119 is also capable of causing one or more energy sources to sequentially process the plurality of cells. For each cell, the controller 119 can cause the light source 101 to generate the light beam 102 and cause the mirror scanner to direct the light beam to follow the path identified by the cell processing recipe associated with the cell.

Each cell processing recipe can include first scan path data that indicates a first path 306a for the light beam to follow within the cell to pre-heat the one or more voxels of the feed material within the cell. For example, the controller 119 can control a galvo mirror scanner, such as the galvo mirror scanner 202a, to direct the light beam along the first scan path 306a. In some implementations, a polygon mirror scanner can be used in the place of or in addition to the galvo mirror scanner. In this case, the path will be a set of parallel lines.

Each cell processing recipe can also include a second scan path data indicating a second path 306b for a light beam to follow within the cell to fuse the one or more voxels of the feed material within the cell. For example, the controller 119 can control a galvo mirror scanner, such as the galvo mirror scanner 202b, to direct the energy beam along the second scan path 306b. The second path 306b need not be the same as the first path 306a. In some implementations, a polygon mirror scanner can be used in the place of or in addition to the galvo mirror scanner. In this case, the path will be a set of parallel lines.

Each cell processing recipe can also include a third scan path data indicating a third path 306c for an energy beam to follow within the cell to heat-treat the one or more voxels of the feed material within the cell. For example, the controller 119 can control a galvo mirror scanner, such as the galvo mirror scanner 202b, to direct the energy beam along the third scan path 306c. In some implementations, a polygon mirror scanner can be used in the place of or in addition to the galvo mirror scanner. The third path 306c need not be the same as the first path 306a or the second path 306b.

In all of the examples previously described, different cell processing recipes can have at least one of different first paths 306a or different second paths 306b for the energy beam. Similarly, all of the examples previously described can include different cell processing recipes that have at least one of different second paths 306b or different third paths 306c for the energy beam. That is, a scan pattern of the first path 306a can be different from a scan pattern of the second path 306b, and a scan patter of the second path 306b can be different than a scan pattern for the third path 306c.

FIG. 4A shows an example of a light source 101 configuration that can be implemented with aspects of this disclosure. In the illustrated implementation, the light source 101 emits a first light beam 302 towards a beam splitter 304. The beam splitter 304 can split the first light beam 302 emitted from the light source 101 into a second light beam 302a, a third light beam 302b, and a fourth light beam 302c. The second light beam 302a is directed towards the first galvo mirror scanner 202a, the third light beam 302b is directed towards the second galvo mirror scanner 202b, and the fourth light beam 302c is directed towards a third galvo mirror scanner 202c. While the illustrated implementation shows the beam splitter 304 directing a light beam to three different optical components, the beam splitter 304 can be configured to direct any number of light beams. For example, if the optical engine 103 included only the first galvo mirror scanner 202a and the second galvo mirror scanner 202b, then the beam splitter 304 may only produce the second light beam 302a and the third light beam 302b. In some implementations, power density of the first light beam 302 can be modulated by the light source 101. In some implementations, the beam splitter can include a power density modulation mechanism for one or more of the light beams. In some implementations, one or more separate, stand-alone power density modulation mechanisms can be used.

FIG. 4B shows an example optical engine that configuration that can be implemented with aspects of this disclosure. The illustrated implementation includes a first light source 304a, a second light source 304b, and a third light source 304c. The first light source 304a emits the first light beam 302a towards the first galvo mirror scanner 202a. The second light source 304b emits the second light beam 302b towards the second galvo mirror scanner 202b. The third light source 304c emits the third light beam 302c towards the third galvo mirror scanner 202c.

While the illustrated implementation shows three separate light sources directing a light beam to three different optical components, any number of light sources can be used. For example, if the optical engine 103 included only the first galvo mirror scanner 202a and the second galvo mirror scanner 202b, then the first light source 304a and the second light source may be the only included light sources. Each of the light sources can individually modulate the power density of the light beams. In some implementations, one or more separate, stand-alone power density modulation mechanisms can be used.

While the beam splitter 304 and the use of multiple light sources 304a, 304b, and 304c have been described in separate implementations, the two concepts can be used in combination. For example, a first light beam can be emitted from a first light source towards a beam splitter. The beam splitter can split the first light beam into a second and third light beam. The second light beam can be directed to the first galvo mirror scanner 202a while the third light beam can be directed towards the second galvo mirror scanner 202b. A second light source can emit a fourth light beam towards the third galvo mirror scanner 202c.

Figure 5:
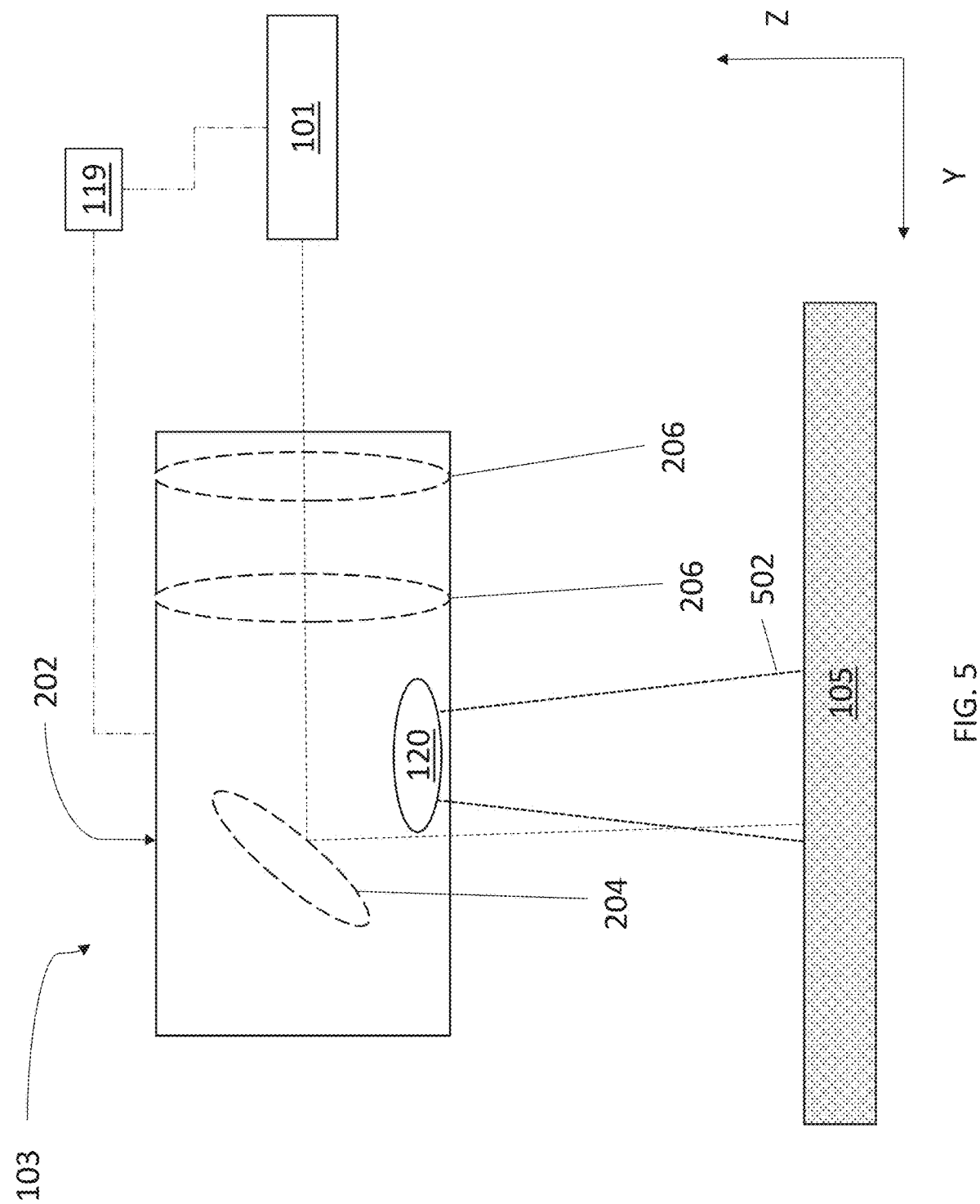
FIG. 5 is a schematic diagram of an example active optical assembly.

In some aspects of operation, the controller 119 can cause the light source 101 and galvo mirror scanner 202 to apply a light beam to at least a portion of the region of the layer of feed material 105 as shown in FIG. 5. In such an implementation, a heat lamp 120 can also emit a wide energy beam 502 to at least a portion of the region of the layer of feed material 105.

In some aspects of operation, the controller 119 is configured to control the first galvo mirror scanner 202a to both pre-heat an area of the feed material 105 before the area has been fused by the second galvo mirror scanner 202b and heat-treat the area after the area has been fused by the second galvo mirror scanner 202b. The controller 119 can control the second galvo mirror scanner 202b to direct a light beam to heat-treat the area of the feed powder 105 after the area has been fused by the second galvo mirror scanner 202b.

In some aspects of operation, the controller can control the plurality of heat lamps 120 to at least partially pre-heat the area of the feed powder 105. The controller can also control the plurality of heat lamps to at least partially heat-treat the area of the feed powder 105 after the area has been fused.

In some implementations, a polygon mirror scanner can be positioned to direct a third light beam onto a topmost layer of the feed powder 105. In such an implementation the controller can control the polygon mirror scanner to direct a light beam at least partially heat-treat the area of the feed powder 105 after the area has been fused by the second galvo mirror scanner 202b. The controller can also control the polygon mirror scanner to at least partially pre-heat the area of feed powder 105 before the area has been fused by the light beam from the galvo mirror scanner 202b.

In some implementations, the additive manufacturing system 100 includes another heat source, e.g., one or more IR lamps arranged to direct heat onto the uppermost layer of the feed material. After pre-heating the first area of the layer of the feed material using the other heat source, a second area of the layer of the feed material can be pre-heated with the polygon mirror scanner, such as the polygon mirror scanner 208a, reflecting the first light beam onto the second area of the layer of the feed material. The second area can be different from the first area of the layer of the feed material. After fusing the first area of the layer of the feed material, the second area of the layer of the feed material can be fused with a galvo mirror scanner, such as the galvo mirror scanner 202, reflecting the second light beam onto the second area of the layer of the feed material after the first area has been pre-heated. The second area can be different from the first area of the layer of the feed material.

Controllers and computing devices can implement these operations and other processes and operations described herein. As described above, the controller 119 can include one or more processing devices connected to the various components of the system 100. The controller 119 can coordinate the operation and cause the apparatus 100 to carry out the various functional operations or sequence of steps described above.

The controller 119 and other computing devices part of systems described herein can be implemented in digital electronic circuitry, or in computer software, firmware, or hardware. For example, the controller can include a processor to execute a computer program as stored in a computer program product, e.g., in a non-transitory machine readable storage medium. Such a computer program (also known as a program, software, software application, or code) can be written in any form of programming language, including compiled or interpreted languages, and it can be deployed in any form, including as a standalone program or as a module, component, subroutine, or other unit suitable for use in a computing environment.

The controller 119 and other computing devices part of systems described can include non-transitory computer readable medium to store a data object, e.g., a computer aided design (CAD)-compatible file that identifies the pattern in which the feed material should be deposited for each layer. For example, the data object could be a STL-formatted file, a 3D Manufacturing Format (3MF) file, or an Additive Manufacturing File Format (AMF) file. For example, the controller could receive the data object from a remote computer. A processor in the controller 119, e.g., as controlled by firmware or software, can interpret the data object received from the computer to generate the set of signals necessary to control the components of the system 100 to fuse the specified pattern for each layer.

The processing conditions for additive manufacturing of metals and ceramics are significantly different than those for plastics. For example, in general, metals and ceramics require significantly higher processing temperatures. Thus 3D printing techniques for plastic may not be applicable to metal or ceramic processing and equipment may not be equivalent. However, some techniques described here could be applicable to polymer powders, e.g. nylon, ABS, polyetheretherketone (PEEK), polyetherketoneketone (PEKK) and polystyrene.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims.

Optionally, some parts of the additive manufacturing system 100, e.g., the build platform 116 and feed material delivery system 107, can be enclosed by a housing. The housing can, for example, allow a vacuum environment to be maintained in a chamber inside the housing, e.g., pressures at about 1 Torr or below. Alternatively, the interior of the chamber can be a substantially pure gas, e.g., a gas that has been filtered to remove moisture, oxygen, and/or particulates, or the chamber can be vented to atmosphere. Pure gas can constitute inert gases such as argon, nitrogen, xenon, and mixed inert gases.

The techniques can be used for hybrid additive manufacturing wherein material is locally fused to a base part or added to repair or rework damaged parts.

In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. An additive manufacturing apparatus, comprising:
    a platform;
    a dispenser to deliver a plurality of successive layers of feed material on the platform; one or more energy sources to provide fusing and at least one of pre-heating or heat-treating of a layer of feed material, wherein the one or more energy sources are configured to provide fusing of selectable voxels of the feed material; and
    a controller configured to
        store a plurality of predetermined cell processing recipes, each cell processing recipe including scan path data indicating representing a scan path pair including a first scan path for one or more energy beams generated by the one or more energy sources to follow to perform a first heating process on one or more voxels of the feed material within a cell that encompasses a plurality of voxels and an independent second scan path for the one or more energy beams to follow within the cell to perform a second heating process on the one or more voxels of the feed material, with different cell processing recipes having different first or second scan paths for the one or more energy beams,
        receive data describing an area of a layer of the feed material to fuse,
        determine a combination of a plurality of non-overlapping cells that substantially cover the area,
        select, for each cell of the plurality of cells and from the plurality of predetermined cell processing recipes, a respective cell processing recipe comprising scan path data representing a respective scan path pair, wherein the respective scan path pair comprises a respective first scan path for one or more energy beams to follow within a particular cell that encompasses a plurality of voxels of a layer of the feed material to perform a first type of heating process on one or more voxels of the plurality of voxels, and a respective second scan path for the one or more energy beams to follow within the particular cell to perform a second type of heating process on the one or more voxels of the plurality of voxels, wherein the respective second scan path is independent from the respective first scan path, and cause the one or more energy sources to sequentially process the plurality of cells, and for each cell, cause the one or more energy sources to generate a first energy beam and a second energy beam, cause the first energy beam to follow the respective first scan path of the selected scan path pair to perform the first type of heating process, and cause the second energy beam to follow the respective second scan path of the selected scan path pair to perform the second type of heating process within the cell.

2. The apparatus of claim 1, wherein the first type of heating process is pre-heating.

3. The apparatus of claim 2, wherein the controller is configured to control a galvo mirror scanner to direct the first energy beam along the first scan path of the selected scan path pair for pre-heating.

4. The apparatus of claim 2, wherein the controller is configured to control a polygon mirror scanner to direct the first energy beam along the first scan path of the selected scan path pair for pre-heating.

5. The apparatus of claim 1, wherein the first type of heating process or the second type of heating process is fusing.

6. The apparatus of claim 5, wherein the controller is configured to control a galvo mirror scanner to direct the first or second energy beam along the first or the second scan path of the selected scan path pair for fusing.

7. The apparatus of claim 1, wherein the second type of heating process is heat-treating.

8. The apparatus of claim 7, wherein the controller is configured to control a galvo mirror scanner to direct the second energy beam along the second scan path of the selected scan path pair for heat-treating.

9. The apparatus of claim 7, wherein the controller is configured to control a polygon mirror scanner to direct the second energy beam along the second scan path of the selected scan path pair for heat-treating.

10. The apparatus of claim 1, wherein the controller is configured to cause the first energy beam to follow the first scan path of the selected scan path pair for preheating the one or more voxels of the plurality of voxels within the cell, and cause the second energy beam to follow the second scan path of the selected scan path pair for fusing the one or more voxels of the plurality of voxels within the cell.

11. The apparatus of claim 1, wherein the controller is configured to cause the first energy beam to follow the first scan path of the selected scan path pair for fusing the one or more voxels of the plurality of voxels within the cell, and cause the second energy beam to follow the second scan path for heat-treating the one or more voxels of the plurality of voxels within the cell.

12. A method of additive manufacturing, comprising: storing a plurality of predetermined cell processing recipes, each cell processing recipe including scan path data representing a scan path pair including a first scan path for one or more energy beams generated by one or more energy sources to follow to perform a first heating process on one or more voxels of feed material within a cell that encompasses a plurality of voxels and an independent second scan path for the one or more energy beams to follow within the cell to perform a second heating process on the one or more voxels of the feed material, with different cell processing recipes having different first or second scan paths for the one or more energy beams, dispensing a layer of a plurality of successive layers of feed material on a platform;

receiving data describing an area of the layer of the feed material to fuse, determining a combination of a plurality of non-overlapping cells that substantially cover the area, selecting, for each cell of the plurality of cells and from the plurality of predetermined cell processing recipes, a cell processing recipe comprising scan path data representing a respective scan path pair, wherein the respective scan path pair comprises a respective first scan path for one or more energy beams to follow within a particular cell that encompasses a plurality of voxels of a layer of the feed material to perform a first type of heating process on one or more voxels of the plurality of voxels, and a respective second scan path for the one or more energy beams to follow within the particular cell to perform a second type of heating process on the one or more voxels of the plurality of voxels, wherein the second scan path is independent from the first scan path, and sequentially processing the plurality of cells, wherein processing the plurality of cells includes, for each cell, causing the one or more energy sources to generate a first energy beam and a second energy beam, causing the first energy beam to follow the respective first scan path of the selected scan path pair to perform the first type of heating process and cause the second energy beam to follow the respective second scan path of the selected scan path pair to perform the second type of heating process within the cell.

13. The method of claim 12, wherein the first type of heating process is pre-heating.

14. The method of claim 12, wherein the first or second type of heating process is fusing.

15. The method of claim 12, wherein the second type of heating process is heat-treating.

16. The method of claim 12, wherein the selected scan path pair is a first selected scan path pair, wherein selecting the scan path pair further comprises selecting a second scan path pair that is different from the first selected scan path pair.

17. The method of claim 12, wherein the first scan path and the second scan path of the selected scan path pair for the cell are traced by the same energy beam.

18. The method of claim 12, wherein the first scan path and the second scan path within the same cell are traced by different energy beams from different energy sources.

19. The method of claim 12, comprising deflecting the first energy beam from a first galvo mirror scanner to cause the first energy beam to follow the first scan path of the selected scan path pair within a cell and deflecting the second energy beam from a second galvo mirror scanner to follow the second scan path of the selected scan path pair within the cell.

20. A computer program product, tangibly encoded in a non-transitory computer readable medium, comprising instructions to cause one or more computers to:

store a plurality of predetermined cell processing recipes, each cell processing recipe including scan path data representing a scan path pair including a first scan path for one or more energy beams generated by one or more energy sources to follow to perform a first heating process on one or more voxels of feed material within a cell that encompasses a plurality of voxels and an independent second scan path for the one or more energy beams to follow within the cell to perform a second heating process on the one or more voxels of the feed material, with different cell processing recipes having different first and second paths for the one or more energy beams, cause a dispenser of an additive manufacturing system to dispense a layer of a plurality of successive layers of feed material on a platform;

receive data describing an area of the layer of the feed material to fuse, determine a combination of a plurality of non-overlapping cells that substantially cover the area, select, for each cell of the plurality of cells and from the plurality of predetermined cell processing recipes, a cell processing recipe comprising scan path data representing a respective scan path pair, wherein the respective scan path pair comprises a respective first scan path for one or more energy beams to follow within a particular cell that encompasses a plurality of voxels of a layer of the feed material to perform a first type of heating process on one or more voxels of the plurality of voxels, and a respective second scan path for the one or more energy beams to follow within the particular cell to perform a second type of heating process on the one or more voxels of the plurality of voxels, wherein the second scan path is independent from the first scan path, and cause the one or more energy sources to sequentially process the plurality of cells, and for each cell, cause the one or more energy sources to generate a first energy beam and a second energy beam and cause the first energy beam to follow the first scan path of the selected scan path pair to perform the first type of heating process and cause the second energy beam to follow the second scan path of the selected scan path pair to perform the second type of heating process within the cell.

* * * * *

UNITED STATES PATENT AND TRADEMARK OFFICE
CERTIFICATE OF CORRECTION

PATENT NO. : 11,084,097 B2
APPLICATION NO. : 15/992094
DATED : August 10, 2021
INVENTOR(S) : David Masayuki Ishikawa, Paul J. Steffas and Ajey M. Joshi Page 1 of 1

It is certified that error appears in the above-identified patent and that said Letters Patent is hereby corrected as shown below:

In the Claims

In Column 12, Line 40, Claim 1, after "data" delete "indicating".

Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*